United States Patent [19]

Ryuo et al.

[11] Patent Number: 5,227,634
[45] Date of Patent: Jul. 13, 1993

[54] RADIATION DETECTOR FOR COMPUTER TOMOGRAPHY

[75] Inventors: Toshihiko Ryuo, Gunma; Takeo Kawanaka, Hyogo, both of Japan

[73] Assignee: Shin-Etsu Chemical Co., Ltd., Tokyo, Japan

[21] Appl. No.: 850,960

[22] Filed: Mar. 12, 1992

[30] Foreign Application Priority Data

Mar. 19, 1991 [JP] Japan .................................. 3-054293

[51] Int. Cl.⁵ ................................................ G01T 1/20
[52] U.S. Cl. ..................................... 250/368; 250/366; 250/367
[58] Field of Search ............ 250/366, 367, 368, 363.03, 250/363.04

[56] References Cited

U.S. PATENT DOCUMENTS 5,091,650  2/1992  Uchida et al. .................. 250/368

Primary Examiner—Carolyn E. Fields
Attorney, Agent, or Firm—McAulay Fisher Nissen Goldberg & Kiel

[57] ABSTRACT

The radiation detector of the present invention comprises a joined scintillator block body which is composed of a plurality of photomultiplier tubes combined together and a plurality of scintillator blocks which are joined to entrance windows of the combined photomultiplier tubes so that the size of the entrance windows is in agreement with that of the light-outgoing plane of the scintillator blocks, the number of the scintillator blocks being greater than that of the photomultiplier tubes. The joined scintillator block body is designed such that the reflectances of the interfaces between the scintillator blocks increase as they are positioned away from the interfaces of the combined photomultiplier tubes.

4 Claims, 5 Drawing Sheets

RADIATION DETECTOR FOR COMPUTER TOMOGRAPHY

BACKGROUND OF THE INVENTION a) Field of the Invention

The present invention relates to a radiation detector used in a radiologic diagnostic apparatus such as a positron emission tomography apparatus (e.g., positron computer tomography; positron CT).

b) Background art

A detector has been used which comprises a photomultiplier tube and a scintillator divided into a plurality of scintillator chips and connected to an entrance window of the photomultiplier tube, as such a radiation detector for the positron emission tomography apparatus. The γ-rays emitted from a radiation source in a subject to be examined are, in order, made incident upon the scintillator chips of the radiation detector to thus emit scintillation light rays. The scintillation light rays are received by the photomultiplier tube and photoelectrically converted into electrical signals by the action of the tube which correspondingly outputs the successive electrical signals. More specifically, detectors have been used comprising a scintillator 2 joined to the entrance window 1a of four photomultiplier tubes 11, 12, 13 and 14, the scintillator 2 having grooves, whose depth at the peripheral portion is greater than that of the grooves present at the central portion and which are divided in the scintillator 2 into a plurality of scintillator chips 21, 22, ..., as shown in FIG. 5. When γ-rays are made incident upon the radiation detector or the scintillator 2, they are, in order, received by different scintillator chips 21, 22, ..., with the lapse of time since the radiation detector is rotated by a driving means. As a result, each scintillator chip 21, 22, ... emits scintillation light rays upon being irradiated with the γ-rays. Since the plurality of scintillator chips 21, 22, ... are separated by the grooves formed so that those present at the peripheral portion have a depth deeper than that of those present at the central portion. The scintillation light rays emitted when the scintillator chip 21 is, for instance, irradiated with the incident γ-rays are principally received by the photomultiplier tube 13, while those emitted when the scintillator chip 22 is irradiated with the incident γ-rays are received by the photomultiplier tube 13 and 14. Thus, the radiation detector can process the intensities of light detected by the photomultiplier tubes 11 to 14 and can accordingly specify a scintillator chip which emits light. The finer the divided scintillator chips 21, 22, ..., the higher the space resolution of the radiation detector and the clearer the tomographic image obtained by the positron emission tomography apparatus provided with the radiation detector.

SUMMARY OF THE INVENTION

As has been explained above, the conventional radiation detector uses a scintillator divided into scintillator chips by grooves having different depths. The grooves are formed by, for instance, an OD saw slicing machine and the widths of the resulting groves are equal to or greater than 0.8 mm. Thus, the grooved portions of the scintillator cannot detect any γ-rays. If the scintillator chips are made finer for the purpose of enhancing the space resolution of the radiation detector, the rate of the area on the scintillator occupied by these grooves is proportionally increased and this in turn leads to an increase of the rate of the area of the portions on the scintillator insensitive to γ-rays.

Accordingly, the object of the present invention is to provide a radiation detector which comprises a plurality of photomultiplier tubes, which has a low rate of the areas occupied by portions insensitive to γ-rays and a high space resolution.

The foregoing object of the present invention can effectively be accomplished by providing a radiation detector which comprises a joined scintillator block body comprising a plurality of photomultiplier tubes combined together and a plurality of scintillator blocks which are joined to an entrance window of the combined photomultiplier tubes so that the size of the entrance window is in agreement with that of the light-outgoing plane of the scintillator blocks, the number of the scintillator blocks being greater than that of the photomultiplier tubes, wherein the joined interfaces between every neighboring two scintillator blocks have different reflectances.

For a better understanding of the present invention, reference is made to the following description and accompanying drawings while the scope of the invention will be pointed out in the appended claims.

DETAILED DESCRIPTION OF THE INVENTION

Figure 1:
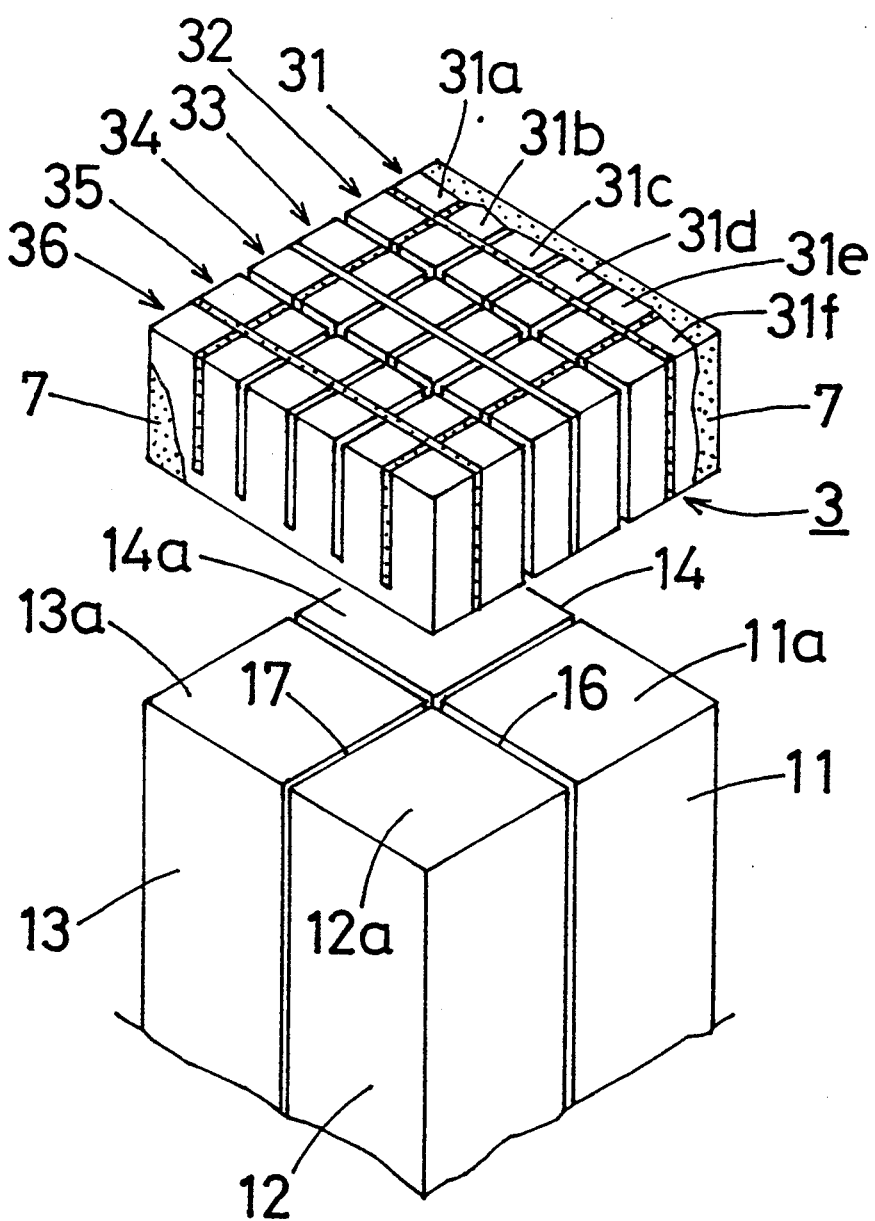
FIG. 1 is an exploded perspective view of an embodiment of the radiation detector of the present invention.

As shown in FIG. 1, the radiation detector of the present invention comprises a joined scintillator block body which is composed of a plurality of photomultiplier tubes (four photomultiplier tubes 11, 12, 13 and 14 in this case) combined together and a plurality of scintillator blocks 31 (31a, 31b, ...), 32 (32a, 32b, ...), ..., 36 (36a, 36b, ...) which are joined to entrance windows 11a, 12a, 13a and 14a of the combined photomultiplier tubes so that the size of the entrance windows is in agreement with that of the light-outgoing plane of the scintillator blocks 3, the number of the scintillator blocks being greater than that of the photomultiplier tubes, wherein the joined interfaces between every neighboring two scintillator blocks have different reflectances.

The foregoing scintillator blocks 3 are designed such that the reflectances of the interfaces between every two neighboring scintillator blocks increase as they are positioned away from the interfaces 16 and 17 of the combined photomultiplier tubes 11, 12, 13 and 14.

For instance, the reflectance of the interface formed between a scintillator block 33 (33a, 33b, ...) and a scintillator block 32 (32a, 32b, ...) is greater than that of the interface formed between the scintillator block 33 (33a, 33b, ...) and a scintillator block 34 (34a, 34b, ...) since the distance between the interface 16 of the combined photomultiplier tubes and the former interface is longer than that between the interface 16 and the latter interface. Further, the reflectance of the interface formed between the scintillator block 32 (32a, 32b ...) and a scintillator block 31 (31a, 31b ...) is greater than that of the interface formed between the scintillator block 33 (33a, 33b, ...) and the scintillator block 32 (32a, 32b, ...). Likewise, the reflectance of the interface formed between the scintillator block 34 (34a, 34b, ...) and a scintillator block 35 (35a, 35b, ...) is greater than that of the interface formed between the scintillator block 33 (33a, 33b, ...) and the scintillator block 34 (34a, 34b, ...). The increase in the reflectance is symmetrical with respect to the interface 16. Further, the reflectance of the interface formed between the scintillator block 35 (35a, 35b, ...) and a scintillator block 36 (36a, 36b, ...) is greater than that of the interface formed between the scintillator block 34 (34a, 34b, ...) and the scintillator block 35 (35a, 35b, ...). On the other hand, if the combined interface 17 formed between the photomultiplier tubes 12 and 13 and between the photomultiplier tubes 11 and 14 is taken as a center line, the reflectance of the interface formed between scintillator blocks 31d, 32d, ..., 36d and scintillator blocks 31e, 32e, ..., 36e is greater than that of the interface formed between scintillator blocks 31c, 32c, ..., 36c and the scintillator blocks 31d, 32d, ..., 36d. Further, the reflectance of the interface formed between the scintillator blocks 31e, 32e, ..., 36e and scintillator blocks 31f, 32f, ..., 36f is greater than that of the interface formed between the scintillator blocks 31e, 32e, ..., 36e and the scintillator blocks 31d, 32d, ..., 36d. In addition, the reflectance of the interface formed between the scintillator blocks 31c, 32c, ..., 36c and scintillator blocks 31b, 32b, ... 36b is greater than that of the interface formed between the scintillator blocks 31c, 32c, ..., 36c and the scintillator blocks 31d, 32d, ..., 36d. Thus, the increase in the reflectance is likewise symmetrical with respect to the interface 17. Moreover, the reflectance of the interface formed between the scintillator blocks 31b, 32b, ..., 36b and scintillator blocks 31a, 32a, ..., 36a is greater than that of the interface formed between the scintillator blocks 31c, 32c, ..., 36c and the scintillator blocks 31b, 32b, ..., 36b.

In order that the reflectances of the interfaces between every neighboring two scintillator blocks 3 increase as they are positioned away from the interfaces 16 and 17 of the combined photomultiplier tubes 11, 12, 13 and 14, the scintillator blocks 3 must have, for instance, the following construction. The construction thereof will be explained with reference to FIGS. 1 and 2B. (1) The interfaces formed between the scintillator blocks 33 (33a, 33b, ...) and 34 (34a, 34b, ...) and between the scintillator blocks 31c, 32c, ..., 36c and the scintillator blocks 31d, 32d, ..., 36d are joined with layers of a transparent filler material 6. (2) The interfaces formed between the scintillator blocks 33 (33a, 33b, ...) and 32 (32a, 32b, ...); between the scintillator blocks 34 (34a, 34b, ...) and 35 (35a, 35b, ...); between the scintillator blocks 31d, 32d, ..., 36d and the scintillator blocks 31e, 32e, ..., 36e; and between the scintillator blocks 31c, 32c, ..., 36c and the scintillator blocks 31b, 32b, ..., 36b are layers 9 of air. (3) The interfaces formed between the scintillator blocks 32 (32a, 32b, ...) and 31 (31a, 31b, ...); between the scintillator blocks 35 (35a, 35b, ...) and 36 (36a, 36b, ...); between the scintillator blocks 31e, 32e, ..., 36e and the scintillator blocks 31f, 32f, ... 36f; and between the scintillator blocks 31b, 32b, ..., 36b and the scintillator blocks 31a, 32a, ..., 36a are layers of a reflecting material 5.

The transparent filler material 6 is preferably a silicone resin composition. The silicon resin composition is preferred because of its high transparency and high refractive index which results in the reduction of reflection at the interfaces. Also preferred are non-solvent type rubbery compositions having good adhesion to the scintillator. Specific examples thereof include KE-109 silicon resin composition available from Shin-Etsu Chemical Co., Ltd. for the scintillators made from $Bi_4GE_3O_{12}$ crystal (BGO crystal).

Preferred reflecting materials include polytetrafluoroethylene (Teflon; trade name) because of its appropriate transparency and refractive index, with that in the form of a tape being particularly preferred. If polytrifluoroethylene or polydifluoroethylene is used instead of the polytetrafluoroethylene, the reflectance of the resulting layer can be reduced. On the other hand, if $TiO_2$ (titanium oxide) or $BaSO_4$ (barium sulfate) is used instead of the polytetrafluoroethylene, the reflectance of the resulting layer can be increased.

Preferred materials for the scintillator include a BGO crystal.

The thickness of the transparent filler material and the reflecting material used for the junction of the scintillator blocks 31, 32, 33, 34, 35 and 36 can be reduced to a level on the order of no more than 0.2 mm. In addition, if the scintillator chips, for instance, 31a, 31b, 31c, 31d, 31e and 31f are designed so as to have the same depth, the scintillator block can be processed with a multi-band saw slicing machine and further the width of the grooves can be reduced to a level on the order of about 0.35 mm. Thus, the rate of the areas on the scintillator block occupied by the portions insensitive to $\gamma$-rays can substantially be reduced.

The function of the joined scintillator block body of the radiation detector according to the present invention will hereinafter be explained. For the sake of simplicity, it will be explained while taking the case wherein each chip of the scintillator block 31 (31a, 31b, 31c, 31d, 31e and 31f) is irradiated with $\gamma$-rays: $\gamma_a$, $\gamma_b$, $\gamma_c$, $\gamma_d$, $\gamma_e$ or $\gamma_f$ by way of example.

The scintillator block 31a emits light rays upon irradiated with $\gamma_a$-rays and the photomultiplier tube 14 receives almost all of the emitted light rays inclusive of those approximately directly propagating towards the photomultiplier tube 14 just behind the scintillator block and those reflected by the side walls of the scintillator block 31a, while the photomultiplier tube 11 receives only a small quantity of the light rays which transmits through the layer of the reflecting material 5 and the uncut portion 8 of the scintillator block. In addition, the scintillator block 31b emits light rays upon irradiated with $\gamma_b$-rays and the photomultiplier tube 14 receives the emitted light rays which approximately directly propagate towards the photomultiplier tube 14 just behind the scintillator block and are reflected by the side wall of the scintillator block 31b on the side of the reflecting material 5 and the interface between the scintillator block 31b and the layer 9 of air, while the photomultiplier tube 11 receives only a small quantity of the light rays which transmits through the layer 9 of air and the uncut portion 8 of the scintillator block just behind the layer 9 of air. Further, the scintillator block 31c emits light rays upon irradiated with $\gamma_c$-rays and the photomultiplier tube 14 receives the emitted light rays which approximately directly propagate towards the photomultiplier tube 14 just behind the scintillator block 31c and only a small quantity of the emitted light rays which are reflected by the side wall of the scintillator block 31c on the side of the transparent filler material 6 and the interface between the scintillator block 31c and the layer 9 of air, while the photomultiplier tube 11 receives a large quantity of the emitted light rays which transmits through the layer of the transparent filler material 6 and a small quantity of the emitted light rays which transmit through the uncut portion 8 of the scintillator block 31c just behind the layer of the transparent filler material 6.

As a result, then umber of photons emitted by the scintillator block 31a and detected by the photomultiplier tube 14 would be greater than that of the photons emitted by the scintillator block 31b and detected by the photomultiplier tube 14 from the viewpoint of probability. Likewise, the number of photons emitted by the scintillator block 31b and detected by the photomultiplier tube 14 would be greater than that of the photons emitted by the scintillator block 31c and detected by the photomultiplier tube 14 from the viewpoint of probability. Further, if the scintillator blocks 31d, 31e and 31f are irradiated with $\gamma_d$-, $\gamma_e$- and $\gamma_f$-rays respectively, the number of photons detected by the photomultiplier tube 14 becomes smaller in the order, that emitted by the scintillator block 31d, that emitted by the scintillator block 31e, that emitted by the scintillator block 31f.

Figure 4:
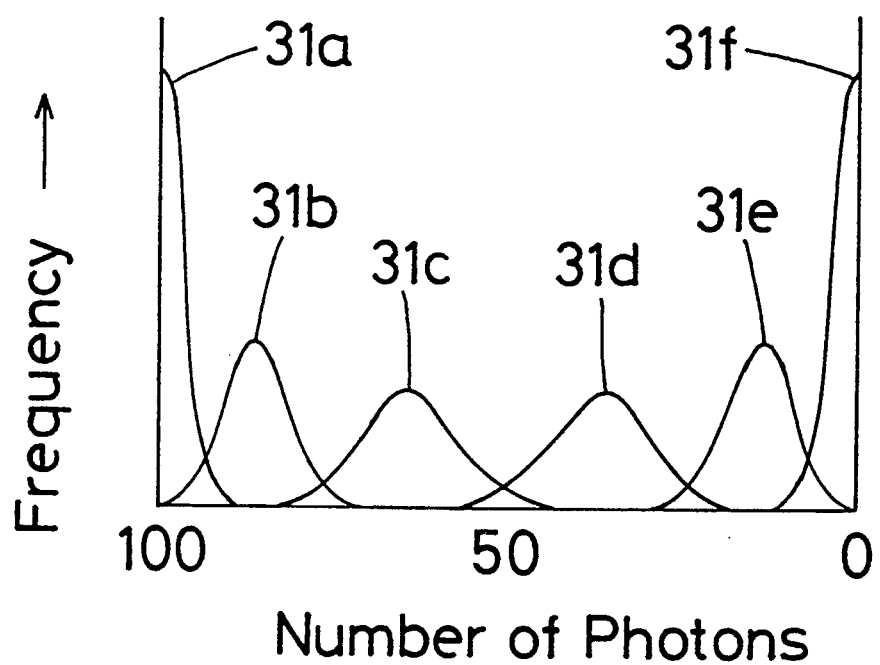
FIG. 4 is a graph showing the frequency distribution of the number of photons emitted by the chips and detected by the radiation detector according to the present invention.
Figure 5:
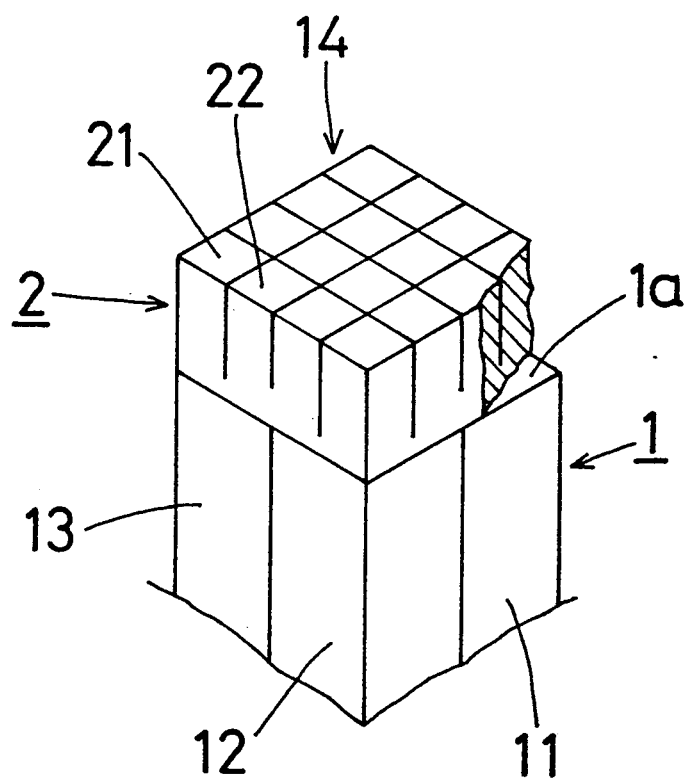
FIG. 5 is an exploded perspective view of an embodiment of the conventional radiation detector.

From the foregoing, the statistical frequency of the number of photons emitted by each scintillator block among those detected by the photomultiplier tube 14 is calculated and shown in FIG. 4. As seen from FIG. 4, when the photomultiplier tube 14 detects a large quantity of photons, the scintillator block which emits light rays would be assumed to be the scintillator block 31a in a very high probability. When the photomultiplier tube 14 detects a large quantity of photons which is second to the first case, the scintillator block which emits light rays would be assumed to be the scintillator block 31b a high probability. In such a manner, the probability of light emission by the scintillator block 31c, 31d, 31e or 31f becomes high in this order as the number of photons detected by the photomultiplier tube 14 decreases.

Thus, which scintillator block 31a, 31b, 31c, 31d, 31e and 31f emits light rays at a specific instance can be presumed by the determination of the peak to which the number of photons detected by the tube 14 at this instance belongs.

Specific Examples of the present invention will be given below.

Figure 2A:
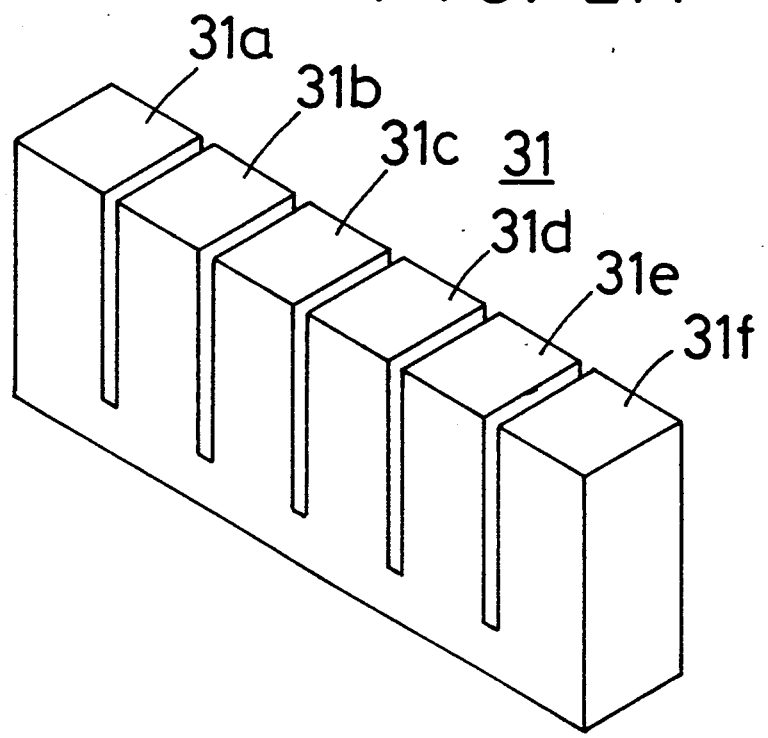
FIGS. 2A and 2B are perspective views each showing a joined scintillator block body in the course of production thereof, which is used in the radiation detector of the present invention.
Figure 2B:
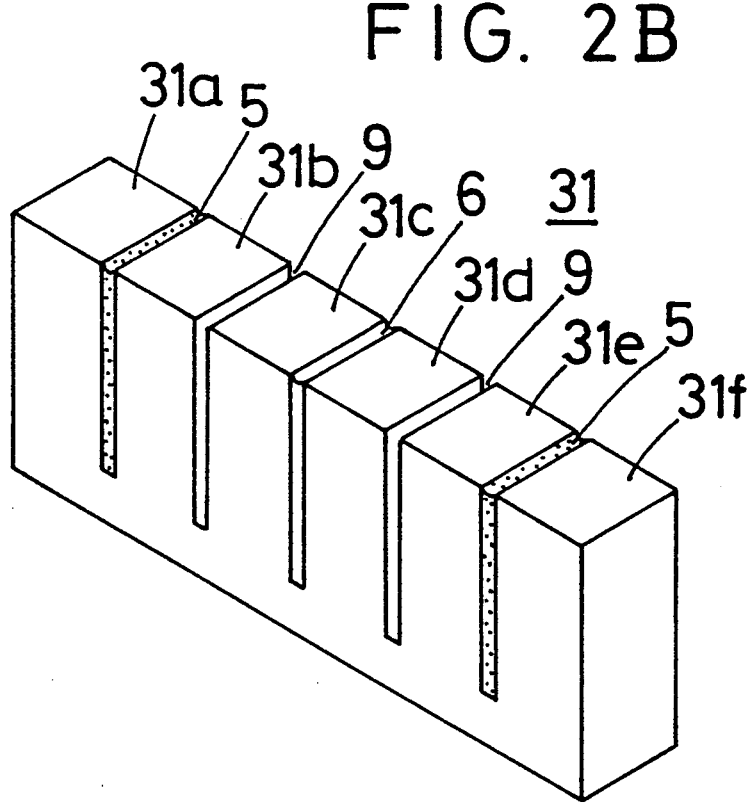

A scintillator block 31 is composed of a BGO crystal having a size of 48 mm×25 mm×4 mm wherein the 6 faces thereof are subjected to lapping with green carbon of GO#600 and then one of the faces of 48 mm×4 mm is mirror-finished with colloidal silica as an abrasive. While leaving the mirror-finished face as it is, five cuts having a width of 0.35 mm and a depth of 23.5 mm are made as shown in FIG. 2A to thus divide the block into smaller scintillator blocks 31a, 31b, 31c, 31d, 31e and 31f. The cut formed between the scintillator blocks 31c and 31d is filled with a silicone resin composition 6 (KE-109 available from Shin-Etsu Chemical Co., Ltd.) as shown in FIG. 2B. Teflon tapes 5 are inserted into the cuts formed between the scintillator blocks 31a and 31b and between the scintillator blocks 31e and 31f and fixed with a cyanamide adhesive (Aron Alpha available from Toagosei Chemical Industry Co., Ltd.).

Other scintillator blocks 32, 33, 34, 35 and 36 have the same structure explained above in connection with the scintillator block 31. The scintillator blocks 33 and 34 are joined through the foregoing silicone resin composition. There are small spaces (i.e., layers of air) between the scintillator blocks 32 and 33 and between the scintillator blocks 34 and 35. The scintillator blocks 32 and 31 and the scintillator blocks 35 and 36 are joined with the foregoing cyanamide adhesive through Teflon tapes respectively.

Teflon tapes 7 are adhered to the five faces (faces lapped with GC#600 adhesive) of the joined scintillator block body 3 comprising these scintillator blocks 31, 32, 33, 34, 35 and 36 except for the mirror-finished one.

Figure 3:
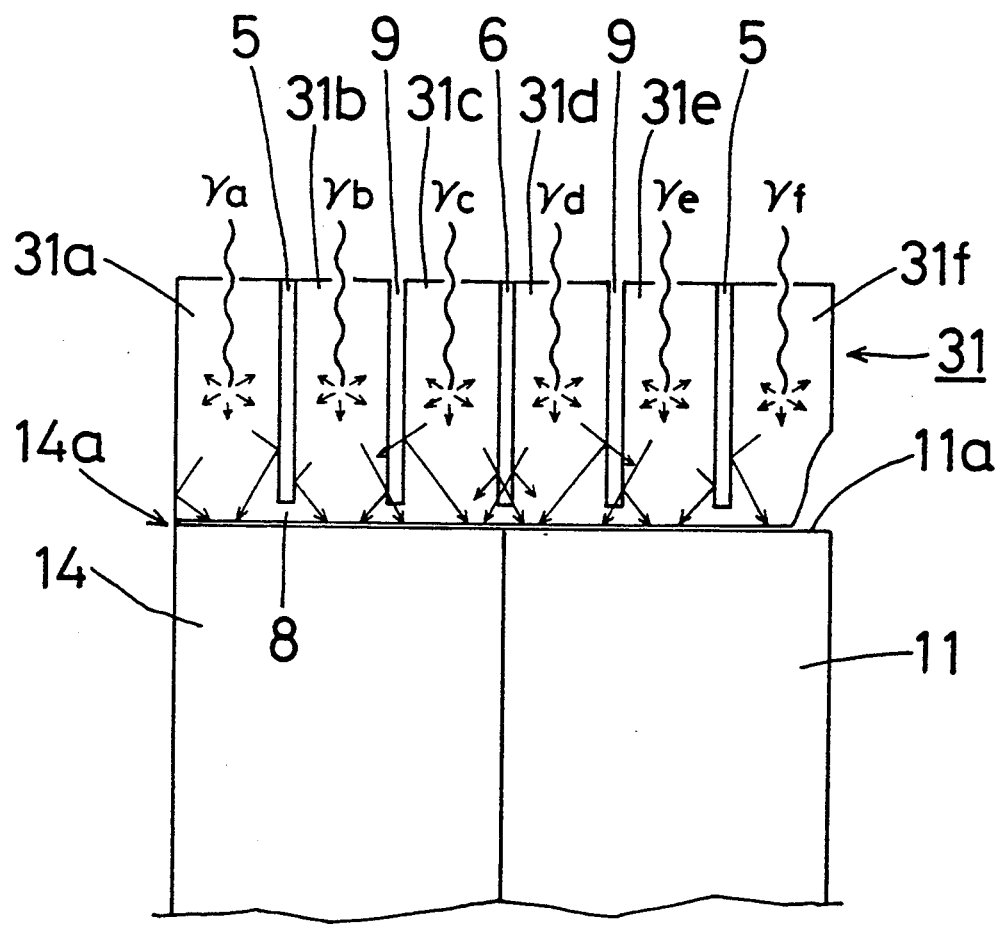
FIG. 3 is a diagram for explaining the operating condition of the radiation detector according to the present invention.

The joined scintillator block body 3 is attached, through a silicone matching oil layer, to the light-receiving window of the four photomultiplier tubes 11, 12, 13 and 14 to complete the radiation detector of the present invention. The resulting joined scintillator block body 3 was irradiated with predetermined dose of $\gamma$-rays to detect and count the number of photons emitted by the scintillator blocks and detected by the photomultiplier tubes 11, 12, 13 and 14. The results obtained are plotted on FIG. 4 which shows frequency distributions of the numbers of photons which were emitted by the scintillator blocks 31a, 31b, 31c, 31d, 31e and 31f (see FIG. 3) and detected by the photomultiplier tube 14.

It should also be understood that the foregoing relates to only the scope of the invention is defined by the appended claims rather than by the description preceding them, and all changes that fall within meets and bounds of the claims, or equivalence of such meets and bounds are therefore intended to embraced by the claims.

What is claimed is:

1. A radiation detector comprising:
   a plurality of scintillator blocks joined together to form a scintillator block unit having an outgoing light plane of a predetermined size;
   a plurality of photomultiplier tubes combined at interfaces having entrance windows;
   said entrance windows being arranged in a plane and having an overall size;
   said entrance windows of said photomultiplier tubes contacting said scintillator block unit;
   said size of the outgoing light plane of said scintillating block unit being in agreement with the overall size of the entrance windows;
   said plurality of scintillator blocks being greater in number than said plurality of photomultiplier tubes;
   wherein grooves divided every scintillator block from one another;
   said scintillator blocks being joined together at interfaces thereof;
   said grooved and joined interfaces between scintillator blocks having layers of transparent filler material, layers of air and layers of a reflecting material in that order as they are positioned away from an interface of the combined photomultiplier tube.

2. The radiation detector of claim 1 wherein the transparent filler material is a silicone resin composition and the reflecting material is one selected from the group consisting of polytrifluoroethylene, polydifluoroethylene and polytetrafluoroethylene.

3. The radiation detector of claim 1 wherein the surfaces of and the joined interfaces of the scintillator blocks are mirror-finished.

4. The radiation detector of claim 1 wherein the scintillator block unit comprises a $Bi_4Ge_3O_{12}$ crystal.

* * * * *